US012511676B1

(12) United States Patent
Mogadala et al.

(10) Patent No.: US 12,511,676 B1
(45) Date of Patent: Dec. 30, 2025

(54) ATTRIBUTE INCONSISTENCY DETECTION SYSTEM

(71) Applicant: Amazon Technologies, Inc., Seattle, WA (US)

(72) Inventors: Aditya Mogadala, Bellevue, WA (US); Sarfaraz Hussein, Atlanta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 399 days.

(21) Appl. No.: 18/064,842

(22) Filed: Dec. 12, 2022

(51) Int. Cl.
*G06Q 30/0601* (2023.01)
*G06F 40/106* (2020.01)
*G06F 40/284* (2020.01)

(52) U.S. Cl.
CPC ....... *G06Q 30/0603* (2013.01); *G06F 40/106* (2020.01); *G06F 40/284* (2020.01)

(58) Field of Classification Search
CPC .. G06Q 30/0603; G06F 40/106; G06F 40/284
See application file for complete search history.

(56) References Cited

U.S. PATENT DOCUMENTS 7,181,471 B1 * 2/2007 Ibuki ..................... G06F 16/345
2022/0207584 A1 * 6/2022 Nakazawa ......... G06Q 30/0623

OTHER PUBLICATIONS

Alt et al., "Fine-tuning Pre-Trained Transformer Language Models to Distantly Supervised Relation Extraction", *ACL*, Association for Computational Linguistics, in 11 pages, 2019.
Clark et al., "ELECTRA: pre-training text encoders as discriminators rather than generators", *8th International Conference on Learning Representations*, ICLR, pp. 1-18, 2020.
Garg et al., "TANDA: Transfer and Adapt Pre-Trained Transformer Models for Answer Sentence Selection" *The Thirty-Fourth AAAI Conference on Artificial Intelligence, AAAI 2020, The Thirty-Second Innovative Applications of Artificial Intelligence Conference, IAAI 2020, The Tenth AAAI Symposium on Educational Advances in Artificial Intelligence*, AAAI Press, pp. 7780-7788, 2020.
Goodfellow et al., "Generative Adversarial Networks", *Communications of the ACM*, 63(11):139-144, 2020.
Jurgens et al., "Semeval-2014 task 3: Cross-level semantic similarity", *Proceedings of the 8th International Workshop on Semantic Evaluation*, SemEval COLING, pp. 17-26, 2014.

(Continued)

Primary Examiner — Athar N Pasha
(74) Attorney, Agent, or Firm — Knobbe Martens Olson & Bear LLP

(57) ABSTRACT

Systems and methods are provided for detecting inconsistencies between product attributes, in which product attributes may be divided into structured and unstructured attributes. Structured and unstructured attributes are represented in text, and analyzed by a model architecture such that an alert may be generated when an inconsistency between a related element of the structured attributes and unstructured attributes is detected. In order to detect an attribute inconsistency, an input vector is formed using the structured attributes, unstructured attributes, and additional semantic information enabling the comparison (e.g., "Long" and "L" are equivalent).

20 Claims, 5 Drawing Sheets

(56) References Cited

OTHER PUBLICATIONS

Kannan et al., "Matching unstructured product offers to structured product specifications", *Proceedings of the 17th ACM SIGKDD international conference on Knowledge discovery and data mining*, pp. 404-412, 2011.
Lan et al., "ALBERT: A lite BERT for self-supervised learning of language representations", *8th International Conference on Learning Representations*, ICLR, pp. 1-17, 2020.
Maadan et al., "Numerical relation extraction with minimal supervision", *AAAI Conference on Artificial Intelligence*, AAAI Press, pp. 2764-2771, 2016.
Mehta et al., "LaTeX-Numeric: Language-agnostic Text attribute extraction for E-commerce Numeric Attributes", *Proceedings of the 2021 Conference of the North American Chapter of the Association for Computational Linguistics: Human Language Technologies: Industry Papers*, NAACL-HLT, pp. 272-279, 2021.
More, A., "Attribute Extraction from Product Titles in eCommerce", *Workshop on Enterprise Intelligence*, KDD, pp. 1-12, 2016.
Sanh et al., "DistilBERT, a distilled version of BERT: smaller, faster, cheaper and lighter" *CoRR*, abs/1910.01108, pp. 1-5, 2019.
Sun et al., "How to fine-tune BERT for text classification?", *Chinese Computational Linguistics—18th China National Conference*, CCL 2019, vol. 11856 of Lecture Notes in Computer Science, pp. 194-206, 2019.
Tan et al., "E-Commerce Product Categorization via Machine Translation", *ACM Transactions on Management Information Systems*, 11(3):1-14, 2020.
Vaswani et al., "Attention is all you need", *Advances in Neural Information Processing Systems 30: Annual Conference on Neural Information Processing Systems*, pp. 5998-6008, 2017.
Wang et al., "GLUE: A multi-task benchmark and analysis platform for natural language understanding", *7th International Conference on Learning Representations*, ICLR, pp. 1-20, 2019.
Wang et al., "Automatic Validation of Textual Attribute Values in E-commerce Catalog by Learning with Limited Labeled Data", *Proceedings of the 26th ACM SIGKDD International Conference on Knowledge Discovery & Data Mining*, pp. 2533-2541, 2020.
Xu et al., "Scaling Up Open Tagging from Tens to Thousands: Comprehension Empowered Attribute Value Extraction from Product Title", *ACL*, Association for Computational Linguistics, pp. 5214-5223, 2019.
Yang et al., "End-to-End Open-Domain Question Answering with BERTserini", *Proceedings of the 2019 Conference of the North American Chapter of the Association for Computational Linguistics: Human Language Technologies (NAACL HLT)*, Association for Computational Linguistics, in 6 pages, 2019.
Zhao, W., "Classification of Customer Reviews on E-commerce Platforms Based on Naive Bayesian Algorithm and Support Vector Machine", Journal of Physics: Conference Series, vol. 1678, pp. 1-7, 2020.
Zheng et al., "OpenTag: Open Attribute Value Extraction from Product Profiles", *KDD*, pp. 1049-1058, 2018.
Zhu et al., "Multimodal Joint Attribute Prediction and Value Extraction for E-commerce Product", *Proceedings of the 2020 Conference on Empirical Methods in Natural Language Processing, EMNLP*, Association for Computational Linguistics, pp. 2129-2139, 2020.

* cited by examiner

ATTRIBUTE INCONSISTENCY DETECTION SYSTEM

BACKGROUND

Computing systems implementing merchant websites may provide a plurality of item listings for display. These item listings can include a title of the item, an item description containing information about the item in prose form, and information in an easy-to-read form, such as a tabular form containing important numerical information about the item. A computing system may provide item listings over a communication network and display the item listings for the user, for example in a web browser.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
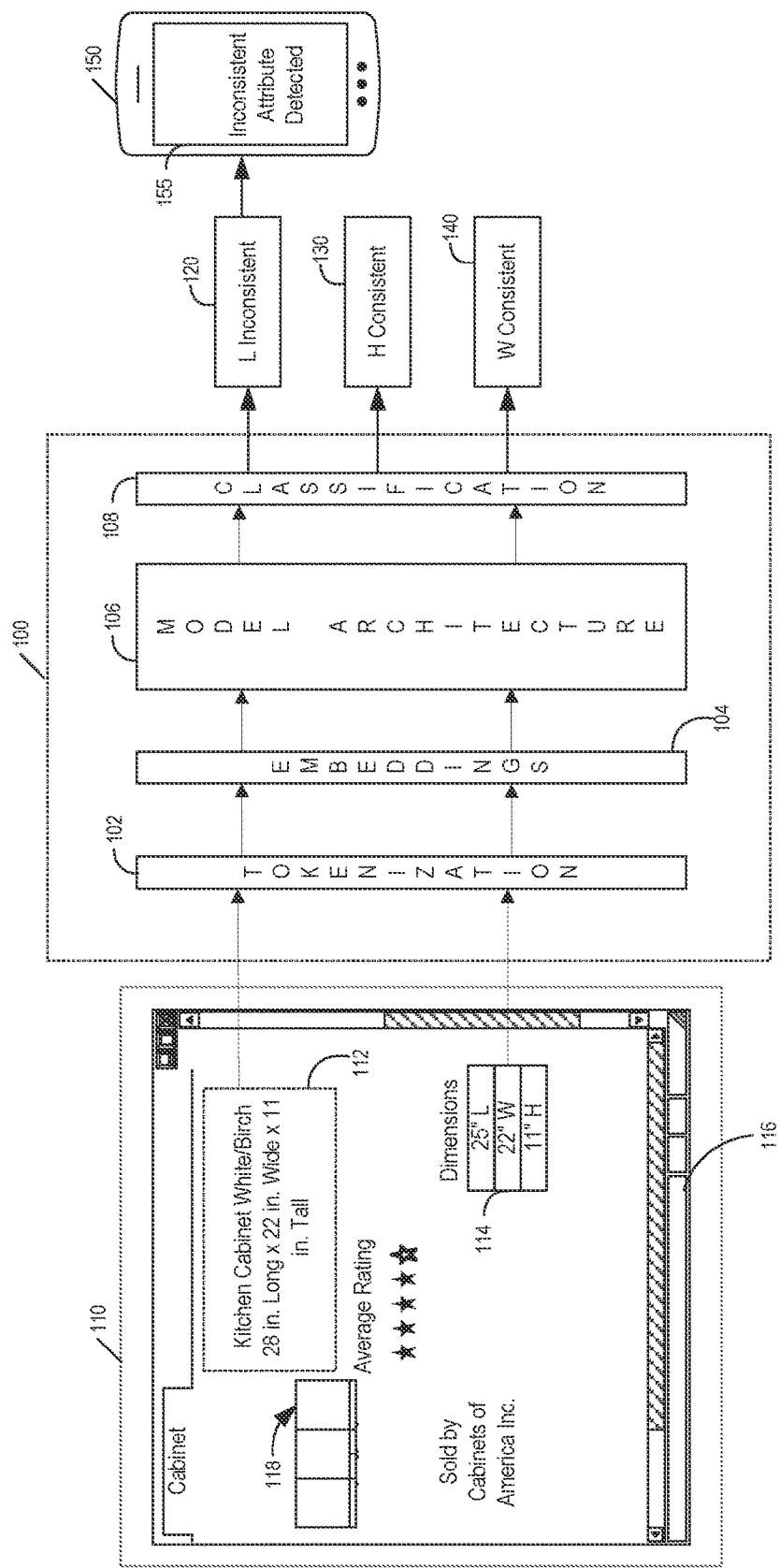
FIG. 1 is a diagram of an illustrative system for detecting inconsistent attributes within information regarding an item according to some embodiments.

The present disclosure relates to detecting inconsistencies in item attribute information. In some embodiments, a machine learning model is used to detect inconsistencies in different types or versions of item attribute information, such as inconsistencies between unstructured attribute information (e.g., a textual description of an item in prose form) and structured attribute information (e.g., quantitative information that is structured as such, separately from text-based prose). Upon detection of an inconsistency in item attribute information, an alert may be generated regarding the detected inconsistency.

Generally described, unstructured attributes may be stored, presented, or otherwise provided in a textual format, such as prose containing both numeric item information and other relevant item information. In contrast, structured attributes may be stored, presented, or otherwise provided in a standard quantitative or qualitative form, such as numerical values and units (e.g., measurements) or alphabetic/alphanumeric characteristics (e.g., names of colors or categories).

Some conventional systems allow for automatic detection of descriptive textual information within an item listing's unstructured attributes (e.g., detecting a height within a textual description provided for an item listing) and conversion of those detected unstructured attributes to structured attributes for an item listing (e.g., a table with the item's dimensions). However, such systems are not capable of reliably detecting inconsistencies between preexisting unstructured and structured attributes on an item's listing. Thus, when a user provides both structured and unstructured attributes for an item listing, there can be inconsistencies that are not detected and that end up being displayed. Display of such inconsistencies in item information can lead to customer confusion, increased rates of item returns, and increased costs of customer support. For example, a box may be titled "Best Cardboard Box! 8' tall, 16" wide, 12" deep. Buy up to 8 in a stack." This textual description contains item dimensions as unstructured attributes. On an item page with the preceding textual description, a section of the listing page meant to display dimensions as structured attributes may show "8"H×16"W×12"L." In this situation, a customer expecting an eight-foot-tall box may be surprised to receive an eight-inch-tall box instead due to the inconsistent item information. Some systems may be configured to detect the numeric dimension information in the textual description, and that 8' is not the same as 8" but would fail to recognize that the "tall" measurement included in the unstructured attributes and the "H" measurement included as a structured attribute are meant to represent the same item dimension. Further, while it may be possible to modify some systems to look for this specific attribute name pairing, those modified systems would not generalize such a capability across the full range of language used to describe item information (e.g., recognizing a relation between "thick" and "wide" when describing item dimensions). Moreover, while manual inconsistency detection methods may improve detection of some inconsistencies, such methods would suffer from being time-prohibitive and resource-intensive. This poses a problem for some applications, such as modern shopping websites, where the volume of listings outpaces the ability to detect inconsistencies, if such an ability is even implemented.

Some aspects of the present disclosure address some or all of the issues noted above, among others, by rapidly analyzing unstructured attributes and their corresponding structured attributes to detect inconsistencies. Alerts may thus be generated and provided to the appropriate party so that these inconsistencies may be corrected.

In some embodiments, a set of one or more unstructured attributes and corresponding structured attributes for an item may be obtained (e.g., from a database, or from a user interface used to submit item information) and evaluated using a machine learning model trained to detect inconsistencies. For example, an attribute inconsistency detection system (also referred to herein as an "inconsistency detection system" or "IDS" for brevity) can obtain unstructured attributes including the word "tall" in an item listing (e.g., in a textual description provided for display on the item listing page), and structured attributes including an "H" or "height" value as a structured attribute for the same item listing (e.g., listed in an item dimensions table provided for display on the item listing page). The system may then use a model trained to compare the numeric values associated with the words "tall" and "height" and determine whether the values are consistent between the unstructured and structured attributes. When the system detects the values are inconsistent, a notification could, for example, be sent to a user (e.g., the product seller) informing them that the "tall" value in the textual description and the dimensions table's listed "height" value are inconsistent and should be corrected.

In some embodiments, the IDS may be trained on one type of attribute data (e.g., height, width, length) and then provided a second type of attribute data for which it would be advantageous to detect inconsistencies (e.g., internal volume, minimum and maximum heights for an object with variable size). Without training on the second type of attribute data, the IDS may compare corresponding structured and unstructured attributes to detect inconsistencies in the second type of attribute data. When the system detects values in the second type of attribute data that are inconsistent, a notification could, for example, be sent to a user informing them that information in the set of the second type of attribute data is inconsistent. The above example reduces the need for gathering data necessary to train the IDS on a specific attribute type. Further, the IDS in the above example may be trained on numeric attributes and detect inconsistencies in textual attributes (e.g., color). Further, the first type of attribute data may be data from a first country, and the second type of attribute data may be data from a second country.

In some embodiments, an attribute inconsistency detection system may use semantic matching to detect conformity or nonconformity between structured and unstructured attributes. To facilitate semantic matching, item attribute information may be preprocessed into pairs of unstructured and structured attributes formatted for input into—and evaluation by—a classification model trained to classify the pairs as consistent or inconsistent. For example, an IDS may determine that the word "tall" is intended to represent the "height" value in a given item listing. The IDS may generate model input labels, such as a truncated version of the unstructured attributes if they are longer than permitted for input into the model, and a standardized version of the structured attributes according to predefined properties of each individual structured attribute to be evaluated. In the example above, the structured attribute for a measurement of the "tall" dimension of an item may be preprocessed into a standardized "height" dimension measured according to a standardized unit of measure (e.g., inches, feet, millimeters, meters, etc.).

In some embodiments, the model used to evaluate pairs of structured and unstructured attributes may have a maximum input size. To ensure that the entire structured attribute input and enough of the unstructured attribute input are provided for evaluation by the model, the unstructured attribute may be truncated. For example, a model may limit the size of an input to k tokens (where k is an integer such as 256, 512, 1024, etc.). Each word of the unstructured attribute may be encoded as a token. Some lengthy textual descriptions that are to be evaluated as unstructured attributes may exceed k tokens, or may exceed k-m tokens (where m is an integer corresponding to the quantity of tokens to be used for inputting a structured attribute). In order to ensure that the structured attribute can be added as input to the model, a truncation strategy may be employed to limit the quantity of tokens used for the unstructured attributes. For example, a maximum quantity of tokens may be reserved for the unstructured attributes, such as k-m tokens. In this case, only the first k-m tokens of the unstructured attributes may be provided as input to the model, and the remaining m tokens of input may be reserved for the structured attribute for which inconsistency is to be evaluated. In some embodiments, the unstructured attributes may be padded with placeholder tokens if the quantity of tokens in the unstructured attributes is less than the maximum tokens allotted for unstructured attributes (e.g., less than k-m tokens), while in other embodiments no padding may be added. In some embodiments, a predetermined separator token may be included between the unstructured and structured attributes, and therefore a maximum of k-m-1 tokens may be used for the unstructured attributes.

In some embodiments, to standardize the format of structured attributes, the structured attributes may be represented by a predetermined quantity of tokens. Structured attributes for measurements may be preprocessed into a three-element list representation where the numeric value, measurement unit, and other information related to the structured attribute are stored as elements in the list representation. For example, if item dimensions list "3" Height, internal" as a structured attribute, then this dimension may be represented in standard form as (3, inches, internal). Restructuring the product's structured attributes into standard form may ease semantic matching with the product's unstructured attributes.

In some embodiments, an attribute inconsistency detection model may be an artificial neural network such as a deep neural network ("DNN") that may use a pre-trained transformer model. The pre-trained transformer model may take embedded values representing pairs of unstructured and structured attribute information corresponding to the same dimension. A feed-forward neural network ("FFNN") layer may take the output from the pre-trained transformer model and determine whether the pairs of unstructured and structured attribute information are consistent for each dimension. Based on output of the FFNN (e.g., classification of a pair of unstructured and structured attributes as consistent or inconsistent), the system may generate an alert when an inconsistency is detected.

Various aspects of the disclosure will be described with regard to certain examples and embodiments, which are intended to illustrate but not limit the disclosure. Although aspects of some embodiments described in the disclosure will focus, for the purpose of illustration, on particular examples of structured and unstructured attribute information, classifications, items, machine learning models, alerts, and the like, the examples are illustrative only and are not intended to be limiting. In some embodiments, the techniques described herein may be applied to additional or alternative types of unstructured attributes, structured attributes, classifications, items, machine learning models, alerts, and the like. Additionally, any feature used in any embodiment described herein may be used in any combination with any other feature or in any other embodiment, without limitation.

Example Attribute Inconsistency Detection and Alert

With reference to an illustrative example, FIG. 1 shows an interface 110 in which a product listing 116 is presented. This product listing 116 consists of various product information data items, which are represented as unstructured attributes in the item description 112 and structured attributes in the table of dimensions 114. The interface 110 may be presented by an application, such a browser application, executing on a computing device, such as a client computing device.

In some embodiments, the product listing 116 may be a web page, such as a page defined by a Hypertext Markup Language (HTML) file or stream. The product listing may include instructions for presenting various content, including textual content, image content, interactive controls, etc. For example, as shown, presentation of the product listing 116 within the interface 110 may include a product image 118, an item description 112, and a table of dimensions 114.

Although the examples of product information data items described herein are generally structured attributes and unstructured attributes representing three separate physical dimension values, such as the table of dimensions 114 and the item description 112, the examples are illustrative only and are not intended to be limiting, required, or exhaustive. In some embodiments, the number of attributes to be compared may be more or less than three dimensions, may represent attributes of an item other than the dimensions, or may be unrelated to a single item. Further, though a dimension of inches is used generally herein, any other type of numeric information identifying a number of units may be used as input for the attribute inconsistency detection system. For example, the units may be feet, meters, square meters, cubic yards, miles per hour, meters per second, degrees Celsius, degrees Fahrenheit, pascals, pounds per square inch, radians, minutes, hours or any other unit which may be assigned a numeric value. In some embodiments, structured attributes may be qualitative in nature or otherwise unable to be adequately represented by numerical values. For example, structured attributes may include color, brand, model, country of origin, or the like.

In the illustrated example, the product listing 116 is a webpage displaying a product image 118, an item description 112, a table of dimensions 114, and any other relevant product information a seller or the website owner may choose to share about the product listing 116. The item description 112 is presented in the form of text on the product listing 116 and contains, in addition to a textual description, numerical values relevant to the product being sold in the product listing 116 and preferably shown in the product image 118. Due to their presentation with a textual description of the product, the numerical values displayed in the text of the item description 112 represent unstructured attribute data of the product listing 116.

In contrast to the item description 112, the table of dimensions 114 is displayed as text on the product listing 116 and represents the structured attribute data of the product displayed by the product image 118. While the structured attribute data of this product listing 116 take the form of a text table displaying dimension values, structured attribute data may take other forms including, but not limited to, a list, an image, or any other form of display suitable to convey information about the product listing 116 in a structured form. In some examples, unstructured data may be extracted from product image 118, e.g., text on product packaging shown in one or more images.

The example attribute inconsistency detection architecture 100 may include various components to collectively detect inconsistencies in unstructured and structured attribute data. The attribute inconsistency detection architecture 100 (also referred to as "AIDA" for brevity) may be implemented as a DNN configured to take a pair of unstructured attribute data and structured attribute data, and return a classification output representing a determination about the conformity of the unstructured and structured attribute data.

In some embodiments, as shown, the attribute inconsistency detection architecture 100 includes a tokenization portion 102, an embedding portion 104, additional model architecture 106 (e.g., one or more hidden layers), and a classification layer 108. The attribute inconsistency detection architecture 100 is arranged to accept the item description 112 and table of dimensions 114 in text form from the product listing 116. The input from the product listing 116 is then passed through the tokenization portion 102 for conversion into token form as input to the embedding portion 104. The quantity of tokens retained from the unstructured attributes and concatenated with tokens for structured attributes may be determined at this portion of the AIDA 100. The embedding portion 104 provides a set of embeddings to the additional model architecture 106.

The additional model architecture 106 may be based on a pretrained transformer model that has been fine-tuned for the task of identifying inconsistency across structured attributes and unstructured attributes. For example, model architecture 106 may be a pretrained transformer with one or more feed forward neural network (FFNN) layers.

Finally, the model architecture 106 provides its output to the classification layer 108. In some embodiments, the classification layer may apply a SoftMax to output of the FFNN layer to generate classification output.

Generally described, the classification layer 108 in particular and the AIDA 100 as a whole make a determination of whether each element of the structured attribute data from the table of dimensions 114 is consistent with the corresponding element of the unstructured attribute data from the item description 112. When a consistent element, such as a consistent height 130 or consistent width 140, is classified as consistent by the classification layer 108, the system may decide not to send an alert of the consistent result. When an element is determined to be inconsistent between the unstructured attribute data and the structured attribute data, such as an inconsistent length 120, the system may send an alert 155 to a device 150 such that a user capable of correcting the determined inconsistent length 120 may be informed that corrective action is necessary. The device 150 may be the same device- or a difference device—as the device which submitted information for the product listing. A detailed routine for comparing product attribute information and determining an inconsistency is shown in FIG. 2 and described in greater detail below.

In some embodiments, as shown in FIG. 1, the system may automatically recognize text containing attribute information, such as the item description 112 and table of dimensions 114, from the product listing 116 and transmit an alert 155 to a device 150. For example, the system may recognize "28 in. Long" as corresponding to "25" L", detect that the number "28" is not equal to the number "25", and transmit an alert 155 indicating an inconsistent attribute was detected. The alert 155 may indicate that an inconsistency was detected, the alert 155 may also indicate what attribute the inconsistency was detected in.

Although the example item description 112 shown in FIG. 1 contains only one set of numeric values which directly corresponds to the number of numeric values in the table of dimensions 114, the example is provided for purposes of illustration only, and is not intended to be limiting. In some embodiments, the item description 112 and dimensions 114 may contain non-numeric attribute information (e.g., a color, a shape, etc.). In some embodiments, additional numeric values may be contained in the item description 112 which may represent values other than unstructured attribute data. In some embodiments, the number of values in the unstructured attribute data may not be equal to the number of values in the structured attribute data. In some embodiments, the units used in the unstructured attribute data may not be the same units used in the structured attribute data. For example, the attribute inconsistency detection architecture 100 may recognize that the unstructured attribute data contains values in feet, while the structured attribute data contains values in meters and perform a conversion between units before determining the consistency between the unstructured attribute data and structured attribute data.

Figure 2:
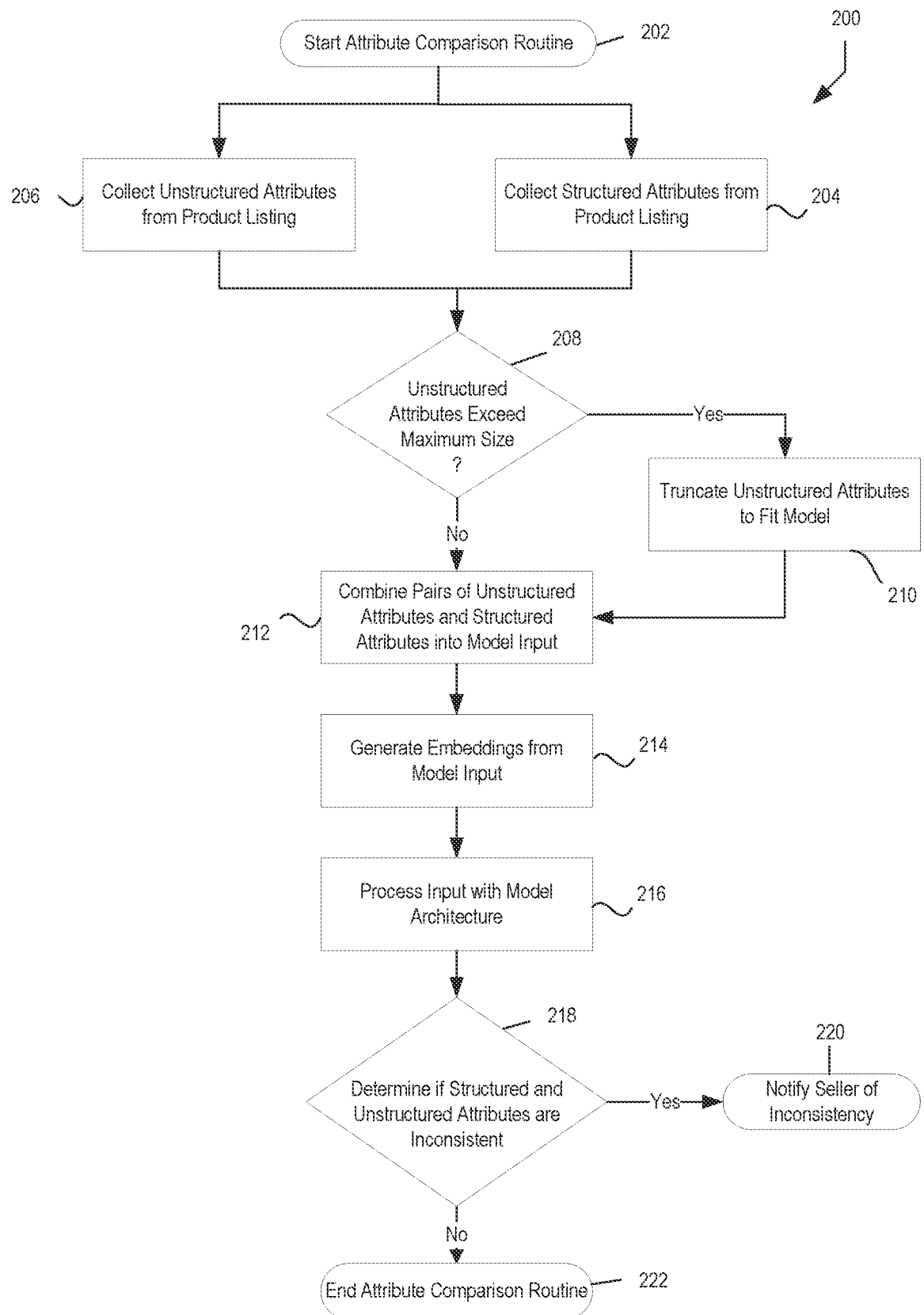
FIG. 2 is a flow diagram of an illustrative routine for comparing item attribute information and determining an inconsistency according to some embodiments.

Example Routine for Comparing Product Attribute Information and Determining an Inconsistency FIG. 2 illustrates example routine 200 for comparing product attribute information and determining an inconsistency. The routine 200 begins at block 202. The routine 200 may begin in response to an event, such as a direction from a user to compare a single product data item, or a plurality of product data items, to detect inconsistencies between attributes in the unstructured attribute data and structured attribute data. For example, a customer may report an inconsistency in displayed information for a single product provided by a seller on a merchant website, and an employee of the merchant website may request the attribute inconsistency detection architecture 100 to look for inconsistencies in any of the product information data items associated with that seller on the merchant website. In some embodiments, a request may be directed to all product information data items associated with a specific product type, a timeframe in which product information data items were posted to the merchant website, or any other subset or superset of product information data items for which detecting inconsistent attributes would be useful.

The routine 200 may also begin automatically. The attribute inconsistency detection architecture 100 may be arranged to process all new product information data items uploaded to the merchant website. The attribute inconsistency detection architecture 100 may alternatively be arranged to process all previously existing product information data items to detect inconsistencies.

Figure 5:
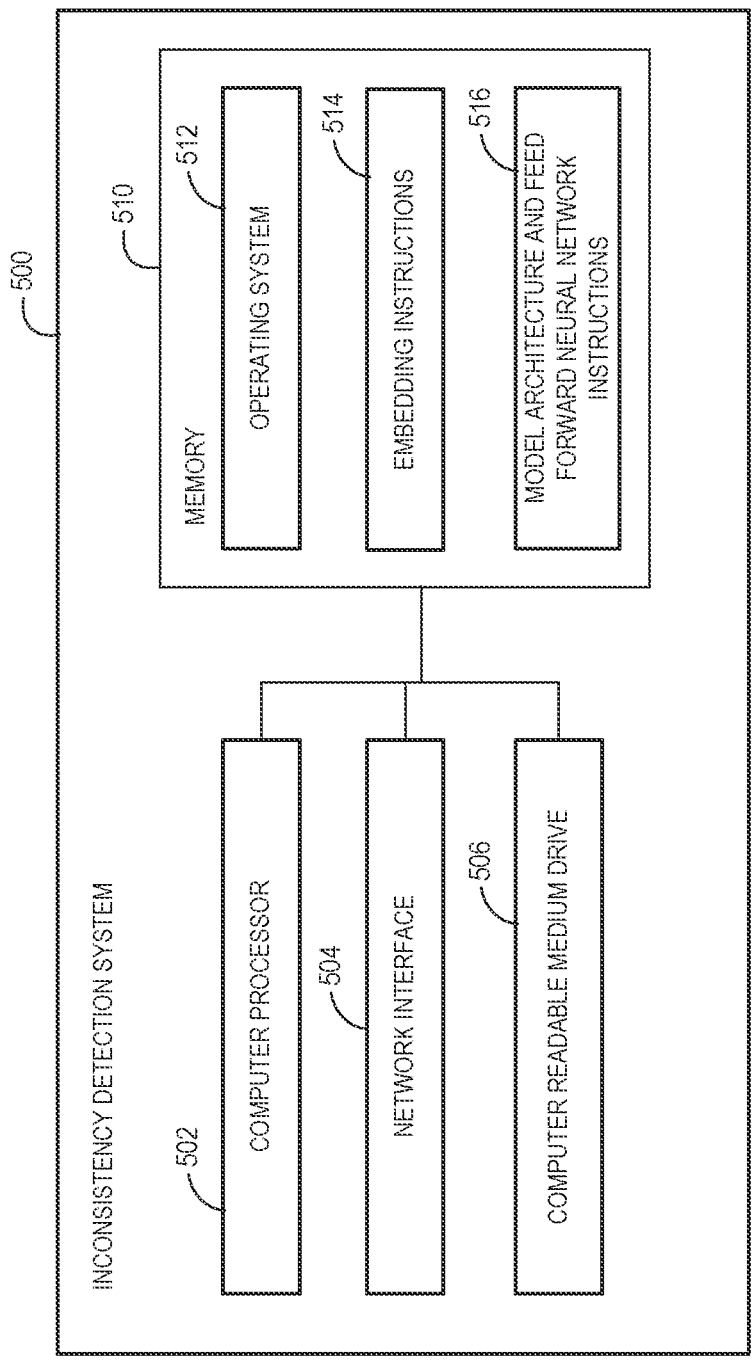
FIG. 5 is a block diagram of an illustrative computing system configured to detect inconsistent item attributes according to some embodiments.

When routine 200 is initiated, a set of executable program instructions stored on one or more non-transitory computer-readable media (e.g., hard drive, flash memory, removable media, etc.) may be loaded into memory (e.g., random access memory or RAM) of an attribute inconsistency detection system, such as the inconsistency detection system 500 shown in FIG. 5, and executed by one or more processors. In some embodiments, the routine 200 or portions thereof may be implemented on multiple processors, serially or in parallel.

At block 204, the inconsistency detection system 500 can collect structured attributes for an item. For example, the IDS 500 may obtain structured attributes from a product listing 116 representing a product information data item uploaded to a merchant website by a seller.

Figure 3:
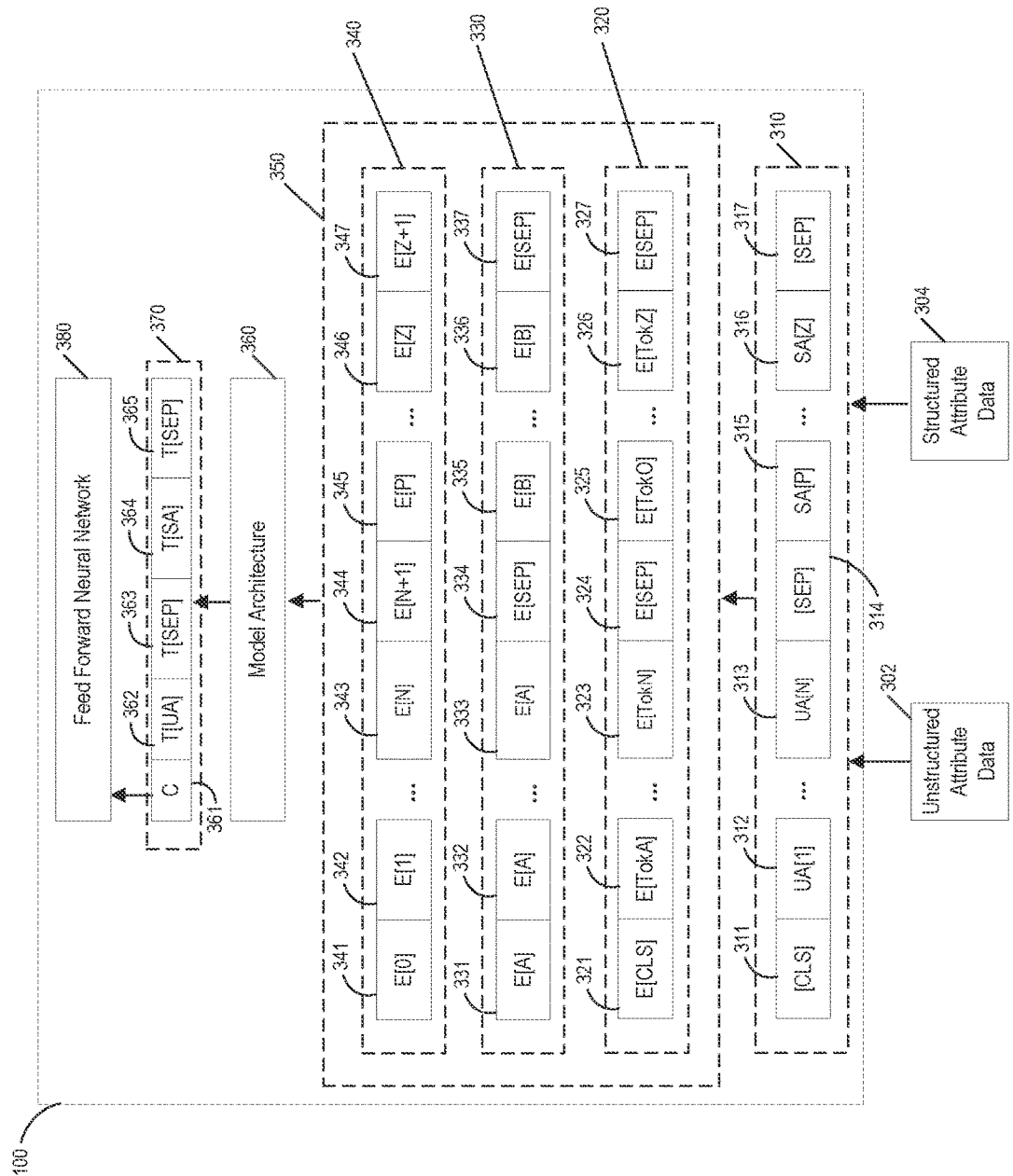
FIG. 3 is a block diagram of illustrative data flows through an attribute inconsistency detection model that may occur when determining inconsistencies in item attributes according to some embodiments.

FIG. 3, discussed here in reference to the elements of routine 200, illustrates an example data flow of information through the AIDA 100. The structured attribute data 304 may be taken from a product information data item used to generate the HTML data of the product listing 116, or any other data structure containing structured attribute information associated with a product listing 116. The structured attribute data 304 may alternatively be taken from the HTML data of the underlying product page. The structured attribute data 304 may alternatively be taken from an image displayed on the product listing using a technique such as optical character recognition (OCR).

At block 206, the inconsistency detection system 500 can collect unstructured attributes for an item. For example, the IDS 500 may obtain structured attributes from the product listing 116 representing a product information data item uploaded to a merchant website by a seller. The unstructured attribute data 302 may alternatively be taken from a product information data item used to generate the HTML data of the product listing 116, or any other data structure containing unstructured attribute information associated with a product listing 116. The unstructured attribute data 302 may alternatively be taken from the HTML data of the underlying product page. The unstructured attribute data 302 may alternatively be taken from an image displayed on the product listing, which may be the product image 118 of the product listing 116, using a technique such as optical character recognition (OCR).

At block 208, the inconsistency detection system 500 can perform a size determination on the unstructured attribute data which may have been collected in block 206. For example, the inconsistency detection system 500 may determine the size of the unstructured attribute data 302, which may contain the entire item description 112 from the product listing 116. When the inconsistency detection system 500 determines that the length of the unstructured attribute data 302 exceeds a maximum input size for a machine learning model (e.g., the model architecture 360 of FIG. 3) or a maximum size allotted for unstructured attributes, the attribute inconsistency detection system 500 may truncate the unstructured attribute data 302 to a suitable size as described below.

At block 210, the unstructured attribute data 302 can be truncated to fit the input size of the machine learning model when combined with the structured attribute data 304. For example, the truncation may be a fixed-length truncation where the structured attributed data is truncated to a fixed length, and a final length of the combined unstructured attribute data 302 and structured attribute data 304 is less than the maximum input length of the model architecture 360. In another example, the truncation may be a maximum length truncation where the final length of the combined unstructured attribute data 302 and structured attribute data 304 is the maximum input length of the model architecture 360. It should be recognized that different machine learning models may have different maximum input lengths, and so the truncation will be based on the specific machine learning model used. Where the length of the combined unstructured attribute data 302 and structured attribute data 304 is less than the fixed length or maximum length truncation sizes, the inconsistency detection system 500 may use padding to create an input meeting a fixed size. The preceding examples of padding and truncation are intended to be illustrative and not limiting.

At block 212, the inconsistency detection system 500 may combine the unstructured attribute data 302 and structured attribute data 304 into a model input. FIG. 3 illustrates an example of the structure of a model input in the form of an input sequence. In this illustrative example, the input sequence is structured as an attribute vector 310. The attribute vector 310 may have a classification header 311 appended before the first element of the unstructured attribute data 302. The attribute vector 310 may first divide the unstructured attribute data 302 into a first portion of a k-element array (e.g., UA[1] 312 through UA[N] 313). The tailing elements of the unstructured attribute data 302 in the attribute vector 310 may optionally include padding values such that the attribute vector is a predetermined length. Further, within this example, a first separator token 314 may be placed between the n-th element of the unstructured attribute data 302 and the first element of the structured attribute data 304 (e.g., the p-th element of the array SA[P] 315). Following the separator token 314, the structured attribute data 304 may be divided into elements of the attribute vector 310. In some embodiments, the tailing element of the attribute vector 310 (e.g., SA[Z] 316) may be a second separator token 317.

At block 214, the inconsistency detection system 500 may create a set of embeddings 350 to prepare the attribute vector 310 for input to the model architecture 360. The set of embeddings 350 may contain token embeddings 320, segment embeddings 330, and position embeddings 340.

In this example, the token embeddings 320 may consist of pre-trained embeddings for alternate product attribute descriptions (e.g., representing height as "h", "H", "height", "high", etc.) where the dimension attributes of the structured attribute data 304 are augmented such that, for example, an attribute representing height is expanded to represent height as ["height", "H", "tall"]. This augmentation may involve the use of at least one label, where the at least one label may represent at least one alternate product attribute description (e.g., "height", "H", "tall", "high", etc.) associated with an attribute of the structured attribute data 304. This augmentation allows the IDS 500 to associate the product attribute description of each attribute of the structured attribute data 304 with an augmented representation, such that the augmented representation is more likely to contain the product attribute description of a corresponding unstructured attribute contained in the unstructured attribute data 302. For example, a product attribute description of a structured attribute of the structured attribute data 304 may be "tall." A product attribute description of an unstructured attribute of the unstructured attribute data 302 corresponding to the structured attribute may use the term "high." The product attribute description of the structured attribute may be augmented to associate "tall" with "H." "high," "height," etc. The augmented form of the structured attribute would then be more easily recognized as corresponding to the unstructured attribute with the product attribute description "high."

Each element of the input sequence (e.g., each item in the attribute vector 310) is converted to an element of the token embeddings 320. The token embeddings 320 may include a classification element embedding 321 at the head of the token embeddings 320. The classification element embedding 321 may be followed by a first token embedding 322 representing the first token embedding representing unstructured attribute data UA[1] 312. Further, a separator token embedding 324 may be positioned between the n-th element of the unstructured attribute data 302 in the attribute vector 310 and the first element of the structured attribute data 304 in the attribute vector 310. For example, between the n-th element representing unstructured attribute data 323 in the token embeddings 320 and the first element representing structured attribute data 325 in the token embeddings 320. The tailing element of the token embeddings 320 may be a token embedding of a second separator token 327 and may follow the final element of the token embeddings 320 representing structured attributes 326.

Further, in this example, the segment embeddings 330 may comprise an array of embeddings representing information related to whether the corresponding element in the token embeddings 320 comes from the unstructured attribute data 302 or the structured attribute data 304. The header of the segment embeddings 330 may be a segment embedding for the classification header 331. The segment embedding for the classification header 331 may be followed by the first segment embedding for the unstructured attribute data 332. The segment embeddings 330 may further contain a position embedding for the first separator token 334 placed between a segment embedding for the n-th element of the unstructured attribute data 333 and the first segment embedding for the structured attribute data 335. The segment embeddings 330 may further contain a position embedding for the second separator token 337 located at the tail end of the segment embeddings 330 following the final segment embedding for the structured attribute data 336.

The final set of embeddings created in this example at block 214 is position embeddings 340. The position embeddings 340 may serve to relate the elements of the token embeddings 320 back to their position within the input sequence. For example, the first position embedding 341 may represent the relative position of the classification header 311. Further, the second element of the position embeddings 342 may represent the relative position of the first unstructured attribute element UA[1] 312. The n-th element of the position embeddings 343 may represent the relative position of the final unstructured attribute element UA[N] 313. The n+1-th element of the position embeddings 344 may represent the position of the first separator token 314, followed by the p-th element of the position embeddings 345 which may represent the position of the attribute vector 310 which may be the first structured attribute SA[P] 315. The final structured attribute element SA[Z] 316 of the input sequence 310 may be represented by the z-th position element 346 of the position embeddings 340. Finally, the tailing position element 347 of the position embeddings 340 may represent the second separator token 317.

At block 216, the set of embeddings 350 may be processed by the model architecture 360. Examples of a model architecture 360 that may perform this processing include, but are not limited to, BERT, DistilBERT, ELECTRA, ALBERT, or other types of machine learning models. The model architecture 360 may use encoders, may be a type of general adversarial network (GAN), etc. In this example, the model architecture 360 will have been pretrained. The model architecture 360 may have been trained to detect inconsistencies on a type of attribute information that is similar to the type of attribute information of the unstructured attribute data 302 and structured attribute data 304. Alternatively, the model architecture 360 may have been trained to detect inconsistencies on a type of attribute information dissimilar to the type of attribute information of the unstructured attribute data 302 and structured attribute data 304. As another alternative, the model architecture 360 may have been trained to detect inconsistencies on attribute information from a first country different from the country the unstructured attribute data 302 and the structured attribute data 304 are obtained from. As another alternative, the model architecture 360 may have been trained to detect inconsistencies on attribute information from one online marketplace which differs from the online marketplace the unstructured attribute data 302 and structured attribute data 304 are obtained from.

At block 218, a determination is made as to whether the elements of the structured attribute data 304 are consistent with the elements of the unstructured attribute data 302. This may be performed in the final hidden layer of the model architecture 360, which acts as a feed forward neural network 380. The feed forward neural network 380 may alternately consist of a separate neural network, or a plurality of hidden layers of the model architecture 360. The feed forward neural network 380 receives its input 370 from the preceding hidden layers of the model architecture 360. The input 370 may contain an element 361 representing the classification header. The input 370 may also include an element representing embeddings of the tokenized unstructured attributes 362, and an element representing embeddings of the tokenized structured attributes 364. The input 370 may also include an element representing the first separator token 363 and an element representing the second separator token 365. The input 370 may also include a token representing an augmented version of the structured attribute data 304 including augmented semantic information (e.g., a label) associating an expanded set of terms related to a product attribute description with each structured attribute of the structured attribute data 304 (e.g., associating a product attribute description of "H" with the terms "tall," "high," etc.). The feed forward neural network 380 can be trained to act as the discriminator and may determine when an inconsistency is present.

When an inconsistency is detected by the feed forward neural network 380, the routine 200 moves to block 220. At block 220, a notification (e.g., alert 155) is sent to a user indicating the inconsistency. The alert 155 may indicate that an inconsistency has been detected generally, or may specify the attribute for which the inconsistency was detected. The alert 155 may be sent to an individual or plurality of individuals with the ability to correct the attribute inconsistency. The alert 155 may additionally or alternately be sent to an individual or plurality of individuals capable of informing a responsible party that correction of the unstructured attribute data 302 or structured attribute data 304 is required to maintain an accurate product listing 116. The alert 155 in this example is a text window sent to a device 150, but could alternately be any type of alert 155 capable of informing a party of the inconsistency detected (e.g., a tonal alert, a voice alert, a flashing light, a pop-up notification on a mobile device, a pop-up alert in the seller's information portal for the merchant website, etc.).

When no inconsistency is detected by the feed forward neural network 380 the routine 200 moves to block 222. At block 222 the routine 200 may terminate. In some embodiments, the routine 200 may send a notification to a seller indicating their product listing 116 has been checked and consistency is confirmed. Alternately or additionally, the routine 200 at block 222 may make a database entry on the merchant website indicating the product listing 116 has been checked by the attribute inconsistency detection system 500 and that the product listing 116 has been found consistent.

Figure 4:
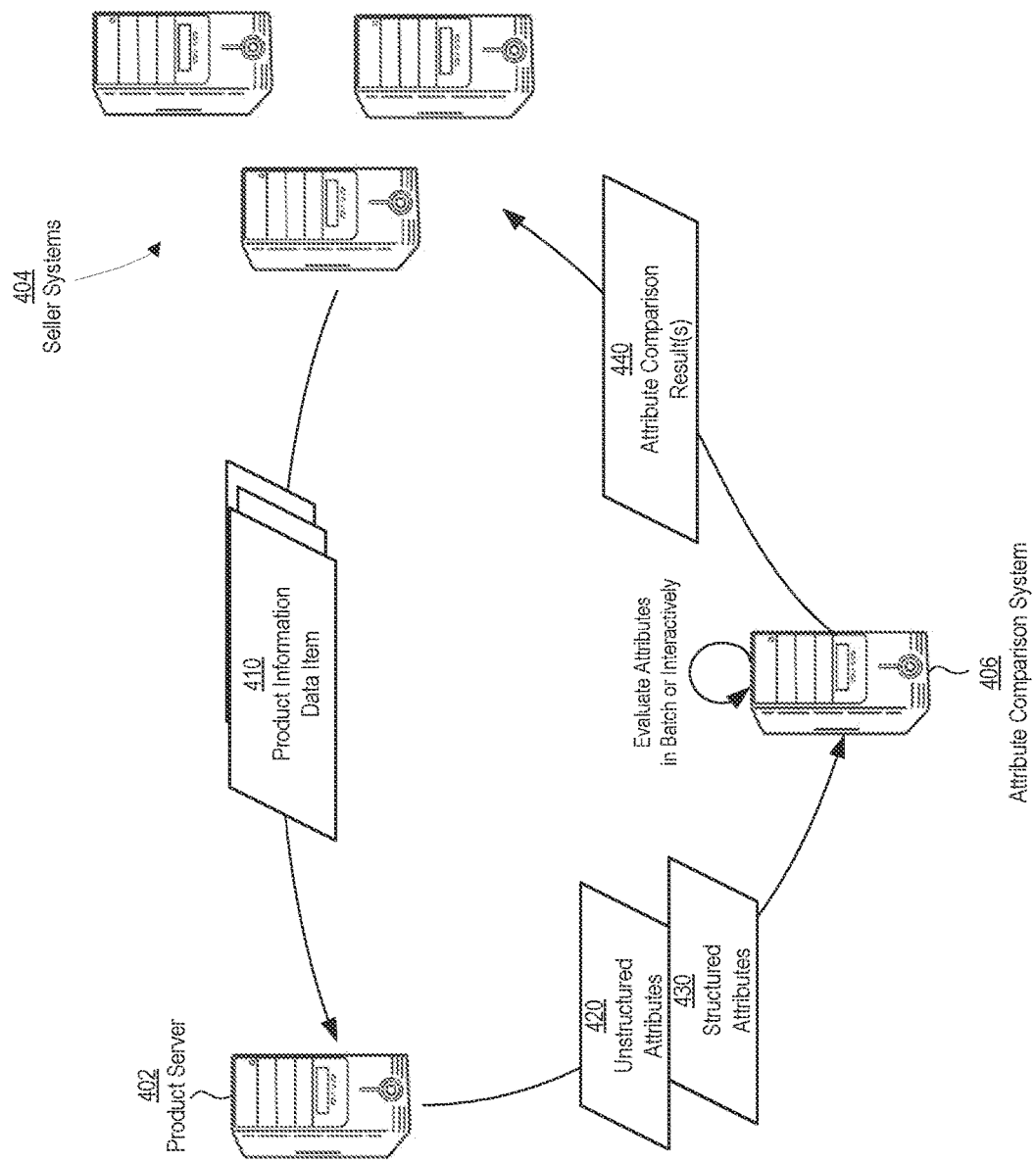
FIG. 4 is a system diagram of illustrative communications that may occur when determining inconsistent item attributes according to some embodiments.

FIG. 4 illustrates an exemplary communications network configured for determining inconsistent attributes for a plurality of items.

In some embodiments, a plurality of seller systems 404 transmits a plurality of product information data items 410 to at least one product server 402. The product server 402 may be operated by a merchant website owner, an individual maintaining a website capable of offering items, or any other party displaying at least one product and an associated product information data item for any purpose.

The product information data items 410 comprise a plurality of unstructured attributes 420 and a plurality of structured attributes 430. The unstructured attributes 420 and structured attributes 430 may be a text-based representation, image-based representation, or any data structure capable of storing attributes associated with the product information data items 410.

The product server 402 transmits the unstructured attributes 420 and structured attributes 430 to the attribute comparison system 406. In one example, the product server 402 may transmit the unstructured attributes 420 and structured attributes 430 to the attribute comparison system 406 in response to a request from a user, or a maintainer of a website displaying a plurality of product information data items 410. This request may, in some configurations, be received by the product server 402 from the seller systems 404. In another example, the product server 402 may transmit the unstructured attributes 420 and the structured attributes 430 to the attribute comparison system 406 at a predetermined regular interval without user input. In another example, the product server 402 may transmit the unstructured attributes 420 and structured attributes 430 to the attribute comparison system 406 in response to a predetermined threshold of new product information data items 410 being transmitted to the product server 402 by the seller systems 404. In some embodiments, the product information data items 410 are items to be listed for sale on a website, and the unstructured attributes 420 may come from an item description. In alternative embodiments, the product information data items 410 may represent any item where it would be advantageous to compare unstructured attributes 420 and structured attributes 430 for consistency.

The inconsistency detection system 500 analyzes the received unstructured attributes 420 and structured attributes 430 to detect inconsistencies between the attributes of the product information data items 410, for example by using the routine 200.

An attribute comparison result 440 may be sent to the seller systems 404, the attribute comparison result 440 containing information about the results of routine 200. Alternatively, an attribute comparison result 440 may be sent only when an inconsistency is detected, as in block 220.

Additionally, while the present figure shows a plurality of server hardware operating separately to maintain the seller systems 404, product server 402, and attribute comparison system 406, in some embodiments a portion or all of the functions may operate on the same physical server hardware, or across multiple pieces of physical server hardware. In further embodiments, the seller systems 404, product server 402, and attribute comparison system 406 are provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

Execution Environment

FIG. 5 illustrates various components of an example attribute inconsistency detection system 500 configured to implement the various functionality described herein.

In some embodiments, the attribute inconsistency detection system 500 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the inconsistency detection system 500 may be implemented as web services consumable via one or more communication networks. In further embodiments, the inconsistency detection system 500 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, an inconsistency detection system 500 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SSDs"), flash drives, and/or other persistent non-transitory computer readable media; one or more input/output device interfaces; and one or more computer-readable memories 510, such as random access memory ("RAM") and/or other volatile non-transitory computer readable media.

The computer-readable memory 510 may include computer program instructions that one or more computer processors 502 execute and/or data that the one or more computer processors 502 use in order to implement one or more embodiments. For example, the computer-readable memory 510 can store an operating system 512 to provide general administration of the attribute inconsistency detection system 500. As another example, the computer-readable memory 510 may store an OCR unit for recognizing segments of an image that include text, and extracting the text from those segments as either unstructured attribute data 302 or structured attribute data 304. As another example, the computer-readable memory 510 may store alternate descriptions of the same attribute (e.g., for "height" also storing "H", "high", etc.). As another example, the computer-readable memory 510 may store a model architecture and corresponding feed forward neural network 516. The 510 may alternately store a plurality of model architectures and corresponding feed forward neural networks 516, such that one or more model architectures and corresponding feed forward neural networks may be selected for a given task as appropriate.

The computer-readable memory 510 may also include computer program instructions that one or more computer processors 502 use in order to implement embeddings for a model architecture and the corresponding feed forward neural network 516. For example, embedding instructions 514 may be stored for generating the embeddings 350 for each of the plurality of model architectures and corresponding feed forward neural networks 516. The embedding instructions 514 may be used to generate a single set of embeddings 350 which are usable by all of the plurality of model architectures and corresponding feed forward neural networks 516. Alternatively, the embedding instructions 514 may instruct the one or more computer processors 502 to generate a set of embeddings only applicable to a subset of the plurality of model architectures and corresponding feed forward neural networks 516.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could." "might." "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including." "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
  a product information store storing a plurality of product information data items, wherein a product information data item of the plurality of product information data items comprises a first textual representation of a plurality of unstructured attributes associated with an item and a second numeric representation of a plurality of structured attributes associated with the item; and
  a server comprising computer-readable memory and one or more processors, wherein the server is configured to:
    receive, from the product information store, the product information data item;
    determine that the first textual representation exceeds a maximum input size of a machine learning model executed by a computing system;
    truncate the first textual representation based on the first textual representation exceeding the maximum input size to reduce the first textual representation to a size that is less than the maximum input size of the machine learning model;
    couple the first textual representation with a portion of the second numeric representation, corresponding to a structured attribute of the plurality of structured attributes, to create an input sequence, wherein the input sequence comprises a separator between the first textual representation and the portion of the second numeric representation, and wherein the input sequence comprises a label indicating an attribute type of the structured attribute;
    generate a model output using the input sequence and the machine learning model trained to detect inconsistencies between individual unstructured attributes and individual structured attributes;
    determine an attribute inconsistency between the first textual representation and the portion of the second numeric representation based on the model output; and
    transmit an attribute inconsistency notification representative of an inconsistent attribute pair based on the model output.

2. The system of claim 1, wherein an architecture of the machine learning model is one of DistilBERT, ALBERT, or ELECTRA.

3. The system of claim 1, wherein the server is further configured to:
  determine that truncation of the first textual representation will result in the plurality of unstructured attributes being under a fixed length, wherein the fixed length is less than the maximum input size; and
  add a padding to the plurality of unstructured attributes subsequent to truncation, wherein a size of the padding is a difference between the size of the plurality of unstructured attributes and the fixed length.

4. The system of claim 1, wherein the machine learning model trained to detect inconsistencies is trained on a first type of item information, and wherein the unstructured attributes and structured attributes are of a second type of item information.

5. A computer-implemented method comprising:
  under control of a computing system comprising one or more computer processors configured to execute specific instructions,
    identifying a first representation of an unstructured attribute from a product information data item;
    truncating based on a size of the first representation exceeding a maximum input size of a machine learning model to be executed by the computing system, the first representation to generate a truncated first representation, wherein the truncated first representation is less than the maximum input size of the machine learning model;
    identifying a second representation of a structured attribute from the product information data item;

generating an attribute vector comprising the truncated first representation, the second representation, and a label indicating an attribute type of the structured attribute;

generating a model output using the attribute vector and the machine learning model trained to detect inconsistencies between individual unstructured attributes and individual structured attributes; and generating an attribute inconsistency notification representative of an inconsistent attribute pair based on the model output.

6. The computer-implemented method of claim 5, wherein the truncating the first representation comprises removing data at an end of the first representation to achieve a fixed length, and wherein generating the attribute vector comprises adding padding to achieve a maximum length of the attribute vector.

7. The computer-implemented method of claim 5, wherein the truncating the first representation comprises removing data at an end of the first representation to achieve an attribute vector with a maximum length of the attribute vector.

8. The computer-implemented method of claim 5, wherein generating the model output using the attribute vector and the machine learning model comprises using a model having an architecture comprising one of DistilBERT, Albert, or ELECTRA.

9. The computer-implemented method of claim 5, further comprising training at least one hidden layer of a plurality of hidden layers of the machine learning model using an attribute training data set.

10. The computer-implemented method of claim 5, further comprising transmitting the attribute inconsistency notification to a user.

11. The computer-implemented method of claim 5, wherein generating the attribute vector further comprises adding a classification header.

12. The computer-implemented method of claim 5, wherein generating the attribute vector further comprises adding a separator token between the first representation and the second representation.

13. The computer-implemented method of claim 5, further comprising generating a first tokenized version of the first representation and second tokenized version of the second representation.

14. A system comprising a server, the server comprising computer-readable memory and one or more processors, wherein the server is configured to:

receive a first representation of an unstructured attribute associated with an item and a second representation of a structured attribute associated with the item;

generate model input data comprising at least a portion of the first representation, at least a portion of the second representation, and a label indicating an attribute type of the structured attribute, wherein the at least a portion of the first representation is truncated to be less than a maximum input size of a machine learning model executing on the server;

determine an attribute inconsistency between the unstructured attribute and the structured attribute using the model input data and the machine learning model trained to detect inconsistencies between individual unstructured attributes and individual structured attributes; and transmit an attribute inconsistency notification.

15. The system of claim 14, wherein the model input data further comprises at least one separator token, and wherein the at least one separator token is located in between a tail of the at least a portion of the first representation and the beginning of the second representation.

16. The system of claim 14, wherein the machine learning model is trained to detect inconsistencies between a first type of structured attributes and a first type of unstructured attributes, and wherein the first representation is of a second type of unstructured attribute which is different from the first type, and wherein the second representation is of a second type of structured attribute which is different from the first type.

17. The system of claim 14, wherein the portion of the first representation is padded to a fixed size.

18. The system of claim 14, wherein the machine learning model comprises a plurality of hidden layers, and wherein at least one of the plurality of hidden layers is trained on an attribute training data set different from a second training data set used to train the machine learning model.

19. The system of claim 14, wherein the label indicating the attribute type of the structured attribute comprises the attribute type of the structured attribute and at least one synonym of the attribute type of the structured attribute.

20. The system of claim 1, wherein the server is further configured to:

reserve a first portion of the maximum input size for the second numeric representation;

calculate a remaining portion of the maximum input size by subtracting the first portion from the maximum input size; and truncate the first textual representation to fit within the remaining portion of the maximum input size.

* * * * *